United States Patent
Mary et al.

(10) Patent No.: US 9,293,883 B2
(45) Date of Patent: Mar. 22, 2016

(54) ELECTRODE OF METALLIC MATERIAL, AND GYROLASER COMPRISING AT LEAST ONE SUCH ELECTRODE

(71) Applicant: THALES, Courbevoie (FR)

(72) Inventors: Alexandre Mary, Chatellerault (FR); Dominique Foucret, Thure (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/682,445

(22) Filed: Apr. 9, 2015

(65) Prior Publication Data

US 2015/0214689 A1    Jul. 30, 2015

Related U.S. Application Data

(63) Continuation of application No. 14/534,589, filed on Nov. 6, 2014, now abandoned.

(30) Foreign Application Priority Data

Nov. 8, 2013 (FR) ...................................... 13 02585

(51) Int. Cl.
  H01S 3/038  (2006.01)
  G01C 19/64  (2006.01)
  C03C 27/04  (2006.01)
  G01C 19/66  (2006.01)
  H01S 3/083  (2006.01)

(52) U.S. Cl.
  CPC .............. *H01S 3/0382* (2013.01); *C03C 27/046* (2013.01); *G01C 19/64* (2013.01); *G01C 19/661* (2013.01); *H01S 3/0385* (2013.01); *H01S 3/0835* (2013.01); *Y10T 428/12389* (2015.01); *Y10T 428/24479* (2015.01)

(58) Field of Classification Search
  CPC ... H01S 3/0382; H01S 3/0385; H01S 3/0835; G01C 19/661
  See application file for complete search history.

(56) References Cited

U.S. PATENT DOCUMENTS 4,595,377 A    6/1986  Norvell
2004/0040941 A1*  3/2004  Ecklund et al. .......... 219/121.63

FOREIGN PATENT DOCUMENTS

EP    0323358 A1    7/1989
EP    2672221 A1    12/2013

* cited by examiner

*Primary Examiner* — Armando Rodriguez
(74) *Attorney, Agent, or Firm* — Michael J. Donohue; Davis Wright Tremaine LLP

(57) ABSTRACT

An electrode (2) of metallic material comprising an axis of revolution (6) and a bottom face (2a) of outer diameter greater than the outer diameter of a top face (2b), characterized in that it comprises a fin (10) of revolution about said axis of revolution (6), on the bottom part of the lateral face (2c), said fin (10) having a radial length L and a thickness h such that the ratio L/h is below a threshold, L and h observing the following relationship:

$$\frac{L \cdot \sqrt[3]{L}}{h} \geq \sqrt[3]{\frac{2EX}{5\sigma}}$$

in which:
  E represents the Young's modulus of the metallic material;
  X represents the minimum deflection tolerated by the fin; and
  σ represents the thermal stress acting on the fin.

20 Claims, 3 Drawing Sheets

ELECTRODE OF METALLIC MATERIAL, AND GYROLASER COMPRISING AT LEAST ONE SUCH ELECTRODE

The present invention relates to an electrode of metallic material, and a laser gyrometer, or gyrolaser, comprising at least one such electrode.

The laser gyrometers or gyrolasers 1 comprise electrodes 2, cathodes and anodes, as illustrated in FIG. 1, used to prime the gaseous mixture, generally a Helium-Neon mixture, in order to obtain the laser effect. These electrodes 2 are linked to a glass or vitroceramic structure 3 (for example of ZERODUR®) by compression of a malleable metallic material 4 (typically an indium alloy). ZERODUR® is a well known non-porous, inorganic glass ceramic material. In order to protect the joint of the link 4, a coating material 5 (typically glue or silicone) is deposited on top in order to insulate the interface material 4 from the environment and safeguard against corrosion phenomena representing a hazard for the operating life of the gyrolaser 1. Such electrodes are generally axially symmetrical relative to an axis 6.

As illustrated in FIG. 2, during temperature rise and cooling cycles, the coating material or glue 5 is subject to stresses 7 because of the difference between the thermal expansion coefficients. They can lead to tensile stresses, and these phenomena are sometimes critical to the integrity of the glue 5. They are observed mainly on the cathode because the stresses involved are greater because of the dimensions. These stresses 7 can result in a slight detachment 8 of the glue 5 and/or cracking 9.

Hereinafter in the present application, the term "glue" for coating material 5 will be taken purely as a non-limiting example.

One aim of the invention is to reduce the tensile stresses on the glue 5, in order to improve the operating life of the junction between the electrodes 2 and the ZERODUR® 3 by limiting premature breaks in the film of glue 5, and do so at reduced cost and without modifying the production line.

There is proposed, according to one aspect of the invention, an electrode of metallic material comprising an axis of revolution and a bottom face of outer diameter greater than the outer diameter of a top face, characterized in that it comprises a fin of revolution about said axis of revolution, on the bottom part of the lateral face, said fin having a radial length L and a thickness h such that the ratio L/h is below a threshold, L and h observing the following relationship:

$$\frac{L \cdot \sqrt[3]{L}}{h} \geq \sqrt[3]{\frac{2EX}{5\sigma}}$$

in which:
  E represents the Young's modulus of the metallic material;
  X represents the minimum deflection tolerated by the fin; and
  σ represents the thermal stress acting on the fin.

Such a fin or blade makes it possible to reduce the tensile stresses on the glue, and improve the operating life of the junction between the electrodes and the ZERODUR® by limiting premature breaks in the film of glue, and does so at reduced cost and without modifying the production line.

In effect, the glue is less subject to tensile stress and more to shear stress, the stresses are distributed over a greater surface area. Therefore, the detachment and the cracking of the glue are significantly limited.

In one embodiment, said threshold depends on the metallic material of the electrode.

Thus, the threshold is adapted to the metallic material of the electrode which makes it possible to best design the suitable fin as a function of the metallic material of the electrode.

According to one embodiment, the fin is straight.

Such a fin is simple to produce.

As a variant, the fin is crenellated.

A crenellated fin improves the limiting of the detachment and the cracking of the glue.

According to one embodiment, said electrode is a cathode.

In effect, the problems of cracks and detachment of the coating material are above all observed on the cathode or cathodes because the stresses involved are greater because of the dimensions.

There is also proposed, according to another aspect of the invention, a gyrolaser comprising at least one electrode as previously described, further comprising a glass or vitroceramic element, a malleable metallic link material arranged between the bottom face of the electrode and the glass or vitroceramic element, and a coating material insulating the link material (or interface material) to safeguard against corrosion phenomena, in which said fin is arranged inside said insulating coating material.

Such a gyrolaser has improved robustness with respect to the external thermal and chemical stresses.

In one embodiment, the metallic material of the electrode comprises aluminum.

The use of aluminum is inexpensive while providing a high resistance to the phenomena of electronic sputtering that exist in the cathodes.

According to one embodiment, said malleable metallic link material comprises indium.

Indium has the advantages of being malleable, even at low temperatures (<−50° C.), hermetic and capable of withstanding the difference in thermal expansion coefficient of the materials of the electrode.

In one embodiment, said insulating coating material comprises glue.

Thus, the indium is insulated from the outside environment which may consist of corrosive/reactive elements, and the use of glue as coating material exhibits an excellent adhesion to the different materials such as metal or glass.

According to one embodiment, said glass or vitroceramic element is of ZERODUR®.

Thus, the cavity length of the gyrolaser remains constant over the operating temperature range of the gyrolaser.

The invention will be better understood on studying a few embodiments described as non-limiting examples and illustrated by the attached drawings in which:

FIG. 1 schematically illustrates a gyrolaser electrode according to the prior art;

In all the Figures, the elements that have identical references are similar.

Figure 1:
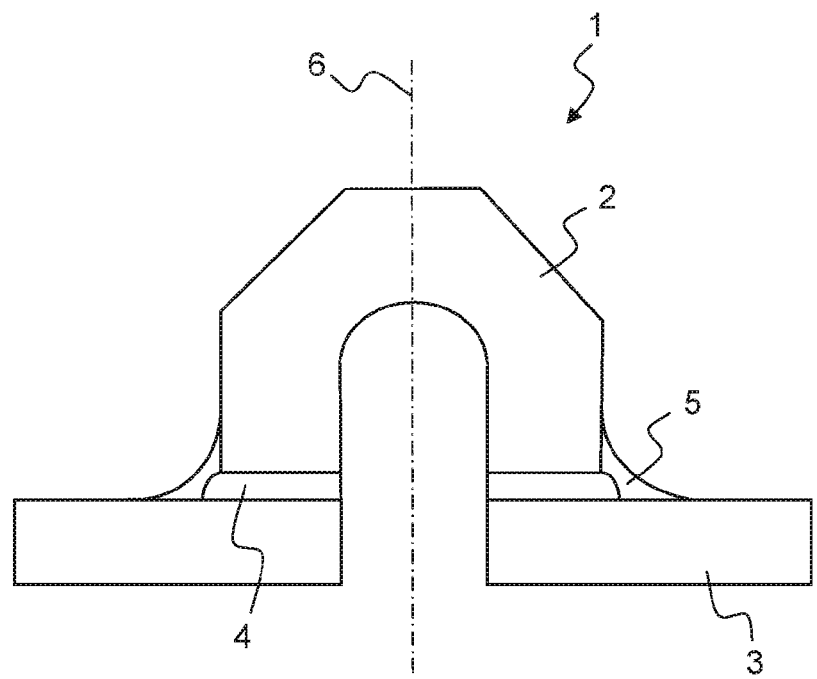
Figure 2:
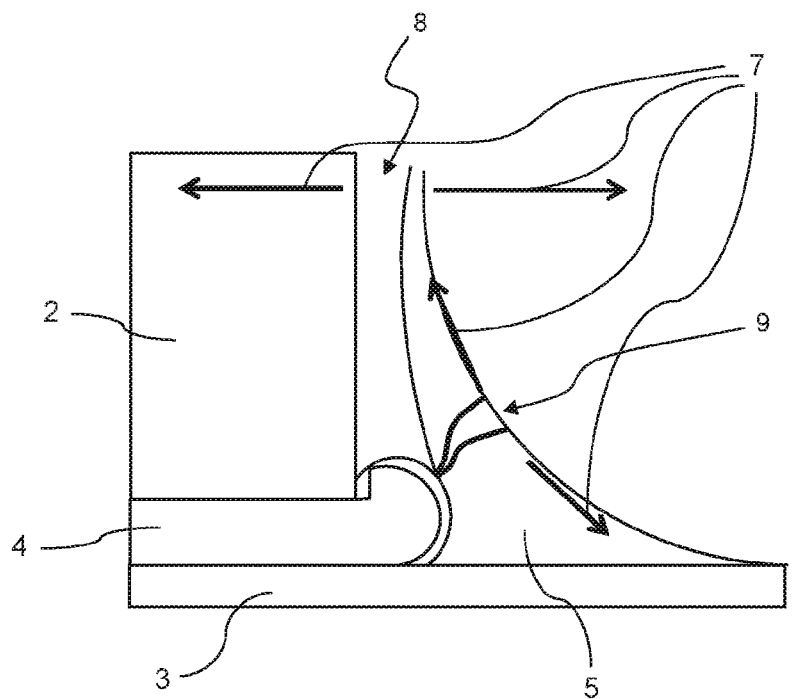
FIG. 2 illustrates the problems of the prior art.
Figure 3:
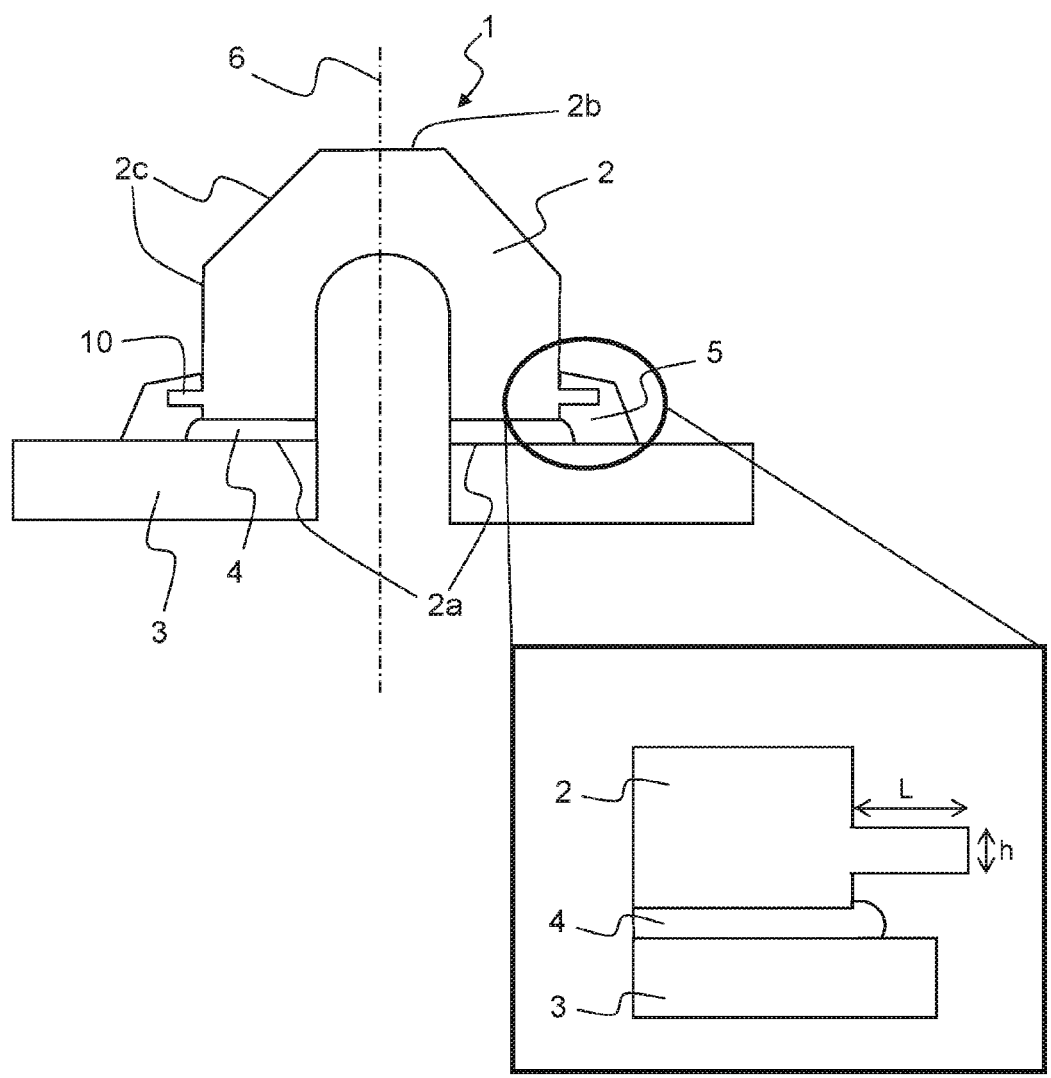
FIGS. 3, 4a and 4b illustrate a gyrolaser electrode embodiment.

As illustrated in FIG. 3, an electrode 2, in this case a cathode, of a gyrolaser, according to one aspect of the invention, is linked to a glass or vitroceramic structure 3 (for example of ZERODUR®) by compression of a malleable metallic material 4 (typically an indium alloy). In order to protect the joint of the link 4, a coating material 5 (typically glue or silicone) is deposited on top in order to insulate the interface material 4 from the environment and safeguard against phenomena of corrosion that represent a hazard for the operating life of the gyrolaser 1. Such electrodes are generally axially symmetrical relative to an axis 6. The cathode 2 is provided with a bottom face 2a of outer diameter greater than the outer diameter of a top face 2b.

The cathode 2 is provided with a fin or blade 10, in this case of revolution according to the axis of revolution 6, on the bottom part of the lateral face 2c.

The fin 10 has a radial length L and a height h such that the ratio L/h is below a threshold, which can depend on the metallic material of the electrode.

Figure 4A:
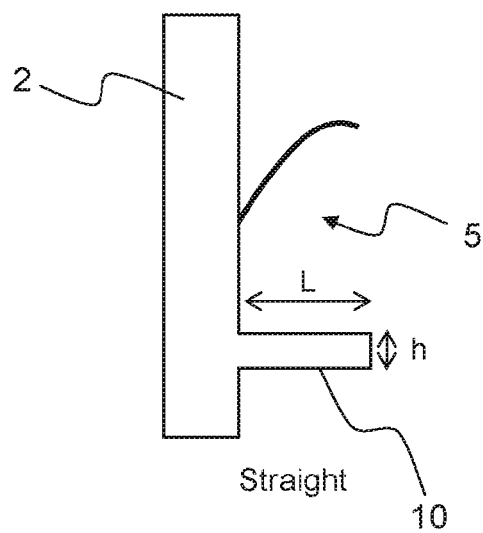
Figure 4B:
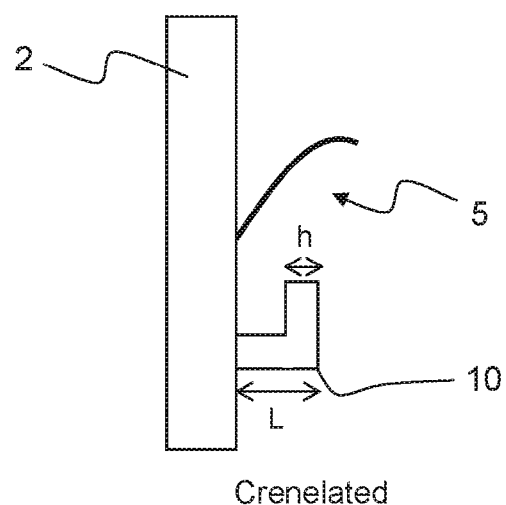

As illustrated in FIGS. 4a and 4b, the radial length L represents the length of the fin 10 in a direction at right angles to the axis of revolution 6.

The fin 10 forms a ledge on the perimeter of the electrode 2, on which the coating material 5 insulating the interface material 4 rests. In addition to increasing the contact surface area, the fin 10 favors a shear stress over a good portion of its surfaces.

Furthermore, the interface material or joint 4 is not in contact with the outside environment, or only in the case of large cracking or complete detachment of the coating material 5 on the fin. The joint 4 therefore has threefold protection:

the coating material 5 is less subject to tensile stress and more to shear stress;

the stresses are distributed over a greater surface area; and the detachment and the cracking do not have the same level of criticality because of the morphology of the coating, for example the bonding.

The cathode or cathodes of the gyrolaser have a fin 10 on the circumference in order for the coating material 5 to adhere thereto while being less exposed to any damage of mechanical type because of the difference in the thermal expansion coefficients.

The link between electrode 2 (for example of aluminum) and the ZERODUR® 3 is made by thermo compression of an indium joint 4. The metallic contact, in addition to residues of chloride on the joint 4, leads, in the presence of an aqueous and/or oxygenated environment, to the corrosion of the joint 4. The operating life of the gyrolaser depends on the integrity of the aluminum/indium interface, because a leak would result in loss of the laser effect in the gyrolaser because of the air pollution. The corrosion threatens this integrity, which is why a protection in the form of glue or other coating product 5 is deposited on the joint 4 in order to insulate it from the environment and thus reduce the risks of localized corrosion.

However, because of the difference in the thermal expansion coefficients, stresses appear in the glue 5 that can lead either to a detachment or a cracking. The most critical types of stresses are tensile stresses.

The fin 10 makes it possible to safeguard against the opening of the insulation. It can for example be straight (FIG. 4a) or crenellated (FIG. 4b) and serves as an attachment surface for the coating material 5.

The indium joint 4 is situated under the fin 10. When the glue 5 is deposited, the latter is fixed mostly on the ledge formed (horizontal part) and less on the body of the cathode 2 (vertical part).

The fixing on the horizontal parts is mainly subject to shear stresses, the bonding is therefore more resistant. By adding crenellations, it is possible to increase the bonding surface area and therefore improve the general withstand strength by distributing the stresses.

Finally, even in the case of detachment on the vertical part or of cracking, the joint 4 is protected from the environment by the fin 10.

For the protection glue 5 to work primarily in shear mode, and not in compression mode, the dimensions of the fin 10 observe the following condition:

$$\frac{L.\sqrt[3]{L}}{h} \geq \sqrt[3]{\frac{2EX}{5\sigma}}$$

in which

E represents the Young's modulus of the metallic material;

X represents the minimum deflection tolerated by the fin; and

σ represents the thermal stress acting on the fin.

By observing this inequation, the fin 10 deflects upon the appearance of the thermal stresses rather than the latter working to tear the joint 4.

The dimensions are quite obviously subject to the rules of feasibility by considering the typical dimensions of a gyrolaser electrode 2, all the bearings (L; h) that satisfy this inequation are valid.

The typical electrode is between 0.5 cm and 4 cm in diameter. Preferentially, the fin 10 has a length of 2.5 mm for a maximum height of 0.5 mm.

The invention claimed is:

1. An electrode (2) of metallic material comprising an axis of revolution (6) and a bottom face (2a) of outer diameter greater than the outer diameter of a top face (2b), characterized in that it comprises a fin (10) of revolution about said axis of revolution (6), on the bottom part of the lateral face (2c), said fin (10) having a radial length L and a thickness h such that the ratio L/h is below a threshold, L and h observing the following relationship:

$$\frac{L.\sqrt[3]{L}}{h} \geq \sqrt[3]{\frac{2EX}{5\sigma}}$$

in which:

E represents the Young's modulus of the metallic material;

X represents the minimum deflection tolerated by the fin (10); and

σ represents the thermal stress acting on the fin (10).

2. The electrode (2) as claimed in claim 1, being a cathode.

3. The electrode (2) as claimed in claim 1, in which the fin (10) is straight.

4. The electrode (2) as claimed in claim 3, being a cathode.

5. The electrode (2) as claimed in claim 1, in which the fin (10) is crenellated.

6. The electrode (2) as claimed in claim 5, being a cathode.

7. The electrode (2) as claimed in claim 1, in which said threshold depends on the metallic material of the electrode (2).

8. The electrode (2) as claimed in claim 7, in which the fin (10) is straight.

9. The electrode (2) as claimed in claim 8, being a cathode.

10. The electrode (2) as claimed in claim 7, in which the fin (10) is crenellated.

11. The electrode (2) as claimed in claim 10, being a cathode.

12. A gyrolaser (1) comprising at least one electrode (2) as claimed in claim 1, further comprising a glass or vitroceramic element (3), a malleable metallic link material (4) arranged between the bottom face (2a) of the electrode (2) and the glass or vitroceramic element (3), and a coating material (5) insulating the link material (4) to safeguard against corrosion phenomena, in which said fin (10) is arranged inside said insulating coating material (5).

13. The gyrolaser as claimed in claim 12, in which the glass or vitroceramic element (3) is of ZERODUR®.

14. The gyrolaser as claimed in claim 12, in which said insulating coating material (5) comprises glue.

15. The gyrolaser as claimed in claim 12, in which said malleable metallic link material (4) comprises indium.

16. The gyrolaser as claimed in claim 15, in which said insulating coating material (5) comprises glue.

17. The gyrolaser as claimed in claim 12, in which the metallic material of the electrode (2) comprises aluminum.

18. The gyrolaser as claimed in claim 17, in which said insulating coating material (5) comprises glue.

19. The gyrolaser as claimed in claim 17, in which said malleable metallic link material (4) comprises indium.

20. The gyrolaser as claimed in claim 19, in which said insulating coating material (5) comprises glue.

\* \* \* \* \*